United States Patent
Steinbusch

[11] Patent Number: 5,874,881
[45] Date of Patent: Feb. 23, 1999

[54] ELECTROMECHANICAL DEVICE, COIL CONFIGURATION FOR THE ELECTROMECHANICAL DEVICE, AND INFORMATION STORAGE AND/OR REPRODUCTION APPARATUS INCLUDING SUCH A DEVICE

[75] Inventor: Hans Steinbusch, Landgraaf, Netherlands

[73] Assignee: U.S. Philips Corporation, New York, N.Y.

[21] Appl. No.: 815,237

[22] Filed: Mar. 12, 1997

[30] Foreign Application Priority Data

Sep. 13, 1996 [EP] European Pat. Off. .............. 96202565

[51] Int. Cl.[6] ....................................... H01F 7/08
[52] U.S. Cl. .......................... 335/222; 310/179; 310/180; 310/208
[58] Field of Search ............................. 335/222; 310/179, 310/180, 208

[56] References Cited

U.S. PATENT DOCUMENTS

| | | | |
|---|---|---|---|
| 4,223,300 | 9/1980 | Wiklund | 340/196 |
| 4,313,152 | 1/1982 | Vranken | 361/402 |
| 4,962,329 | 10/1990 | Fujita et al. | 310/208 |
| 5,331,244 | 7/1994 | Rabe | 310/180 |
| 5,510,663 | 4/1996 | Van Loenen | 310/179 |

FOREIGN PATENT DOCUMENTS

| | | | |
|---|---|---|---|
| 0207996A1 | 1/1987 | European Pat. Off. | H02K 3/26 |
| 3447980C2 | 3/1986 | Germany | H02K 29/06 |

*Primary Examiner*—Lincoln Donovan
*Assistant Examiner*—Tuyen T. Nguyen
*Attorney, Agent, or Firm*—F. Brice Faller

[57] ABSTRACT

An electromechanical device has a coil configuration comprising an insulating substrate (30) carrying a first group of 12 series-connected spiral conductor patterns (21a–21m) and a second group of 12 series-connected spiral conductor patterns (22a–22m). Some of the conductor patterns (21a, 22a, 21d, 22d, 21e, 22e, 21i, 22i, 21j, 22j, 21m and 22m) are disposed on the upper side of the substrate (30). Other ones of the conductor patterns (21b, 22b, 21c, 22c, 21f, 22f, 21h, 22h, 21k, 22k, 21l and 22l) are disposed on the underside of the substrate (30). The conductor patterns on both sides of the substrate (30) are electrically interconnected by means of plated-through connections (40). The first group is in arranged in parallel with the second group by means of common connection electrodes (51 and 52). The conductor patterns (21a–21m) of the first group and the conductor patterns (22a–22m) of the second group are carried by the same substrate (30).

7 Claims, 3 Drawing Sheets

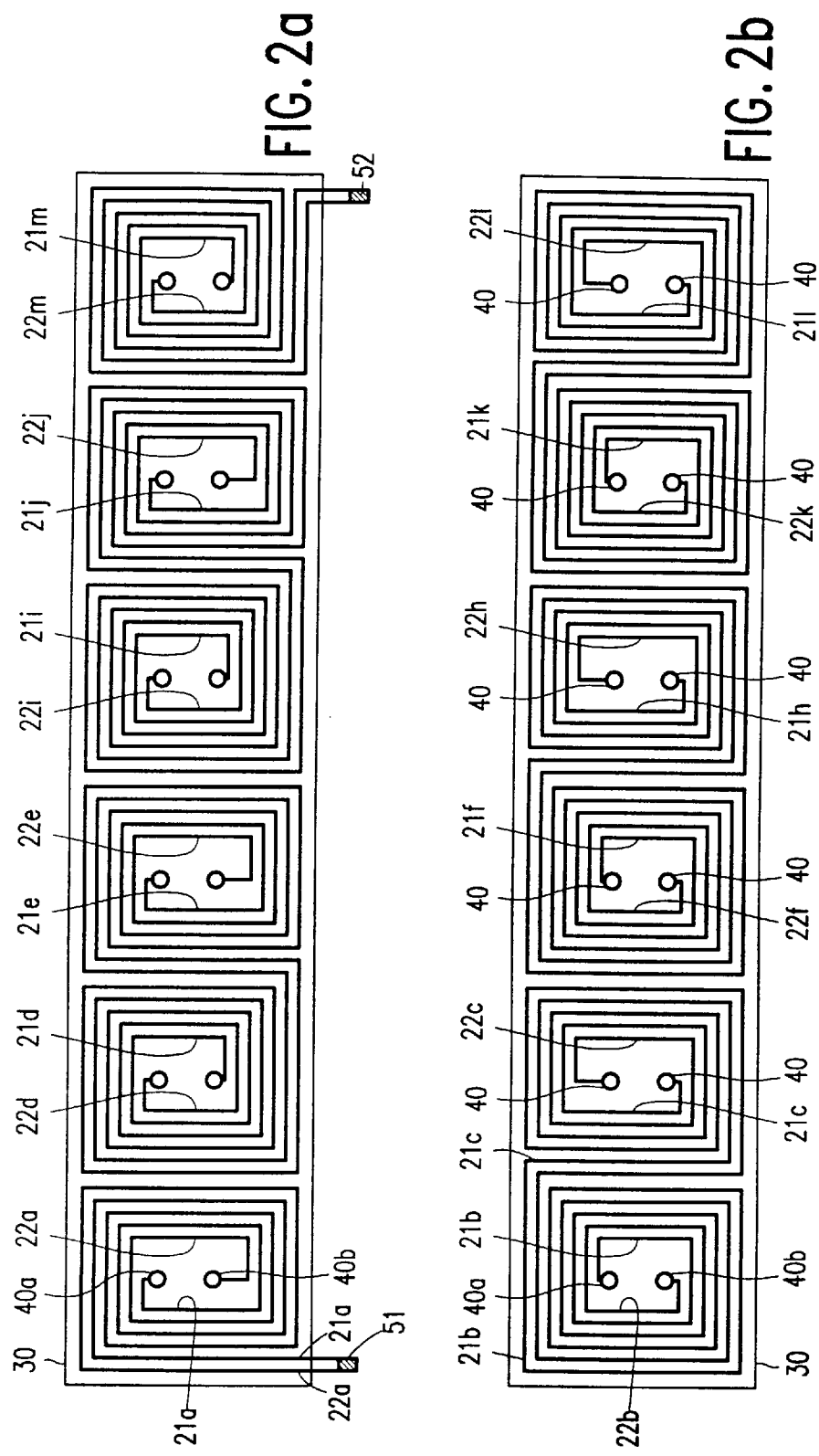

ELECTROMECHANICAL DEVICE, COIL CONFIGURATION FOR THE ELECTROMECHANICAL DEVICE, AND INFORMATION STORAGE AND/OR REPRODUCTION APPARATUS INCLUDING SUCH A DEVICE

BACKGROUND OF THE INVENTION

The invention relates to an electromechanical device comprising a coil configuration and a magnet system which generates a magnetic field at the location of the coil configuration, which coil configuration and magnet system are supported so as to be movable relative to one another, the coil configuration comprising a first group of N series-connected spiral conductor patterns on an insulating substrate and a second group of N series-connected spiral conductor patterns on an insulating substrate, the first group being arranged in parallel with the second group.

Such a device is known from EP-A-0 624 to which U.S. Pat. No. 5,510,663 corrresponds. The known device concerns an axial air-coil motor and has a permanent magnet rotor and a stack of foils comprising a plurality of sub-stacks. Each of the foils carries spiral conductor patterns. EP-A-0 624 945 states that, in order to obtain a higher driving power, the sub-stacks can be arranged in parallel with one another. A disadvantage of the known device is that the efficiency of said device is adversely affected by such parallel arrangement.

SUMMARY OF THE INVENTION

It is an object of the invention to provide an electromechanical device of the type defined in the opening paragraph, which has an improved efficiency. To this end the conductor patterns of the first group and the conductor patterns of the second group are carried by a common substrate. To develop sufficient power at low voltages large currents and, as a consequence, a low resistance of the coil configuration are required. Conductor patterns on a substrate are preferably manufactured by etching away parts of a metal layer deposited on the substrate. This manufacturing method limits the thickness of the metal layer. To obtain a low resistance in spite of this, the conductor patterns can be formed by means of broad tracks. However, such broad tracks give rise to eddy current losses. These eddy current losses are proportional to the third power of the width of the tracks. A substantial reduction of the eddy current losses can already be obtained if one broad track is divided into two conductor patterns with tracks which are half as wide. Parallel arrangement of groups is therefore desirable if the device is to be used for low voltages.

The invention is based on the recognition that the adverse effect of the parallel arrangement on the efficiency of the known device is caused by the fact that the magnetic field is not equally strong at the location of the different foils. The magnetic field varies with the height relative to the magnet system, inter alia as a result of the deflection of field lines near transitions between a north pole and a south pole of the magnet system. In the known device a first foil carries the first group of conductor patterns and a second foil carries the second group of conductor patterns. As a result of this, the first group and the second group are not disposed at the same height relative to the magnet system. This means that in the known device the magnetic flux linkage for the first group of conductor patterns differs from the magnetic flux linkage for the second group of conductor patterns. As a result, the induced voltage across these groups differs owing to a relative velocity between the coil configuration and the magnetic field. Since these groups are arranged in parallel an eddy current is produced which is equal to the voltage difference divided by the series resistance of these groups. This eddy current leads to losses, as a result of which the efficiency of the device is not satisfactory. As said series resistance is generally low, the losses are high in relation to the total power dissipation in the device. Owing to the measures in accordance with the invention the first group and the second group are disposed at the same height relative to the magnet system, so that the flux linkage for the first group and that for the second group come closer to one another and the eddy current losses are reduced.

An embodiment of the electromechanical device in accordance with the invention is characterized in that each conductor pattern of the first group is disposed concentrically relative to a conductor pattern of the second group. This measure minimizes differences in the induced voltage caused by field strength variations in directions transverse to the principal direction of the field lines. As a result of this measure, the conductor patterns of the first group are situated at substantially the same position as the conductor patterns of the second group. Consequently, variations in field strength for both groups substantially concur and differences in induced voltage and losses as a result of these differences are further reduced.

An embodiment of the electromechanical device in accordance with the invention is characterized in that a conductor pattern of the first group and a conductor pattern of the second group together form a double spiral. Owing to this measure both conductor patterns encompass substantially the same flux, as a result of which the induced voltages across the two conductor patterns are substantially equal.

An embodiment of the electromechanical device in accordance with the invention is characterized in that the conductor patterns of the first group are regularly divided over the magnetic field and the conductor patterns of the second group are regularly divided over the magnetic field. Owing to this measure the induced voltage across a group is built up from uniformly distributed parts of the magnetic field. If, for example, the magnet is not magnetized uniformly or if, in a magnet system comprising a magnet and a closing iron, the distance between the magnet and the closing iron is not the same everywhere, different voltages will be induced in various conductor patterns as a result of variations of the magnetic field. Owing to the above-mentioned measure these voltages are averaged, thereby reducing differences in induced voltages across the two groups.

An embodiment of the electromechanical device in accordance with the invention is characterized in that the total length of the conductor forming the first group is substantially equal to the total length of the conductor forming the second group. In the case of similarly shaped conductor patterns the total flux linkage of the first group and that of the second group appear to be the same as a result of this measure. In the design stage this can readily be verified by disconnecting the first group and the second group and separately measuring the induced voltage across the first group and that across the second group while the magnet system is moved relative to the coil configuration.

The invention also relates to an apparatus for the storage and/or reproduction of information on/from an information carrier, comprising a head for writing and/or reading information on/from the information carrier and an electromechanical device in accordance with the invention, for generating a relative movement of the information carrier with respect to the head. The use of an electromechanical device in accordance with the invention in the form of an air-coil motor has special advantages in such an apparatus because such a motor does not have a detent torque. This assures a highly uniform relative movement of the head with respect to the information carrier. A uniform movement results in small time errors in reading and/or writing the information on the information carrier, enabling the frequency of the information stream to be increased.

The invention also relates to a coil configuration comprising a first group of N series-connected spiral conductor patterns on an insulating substrate and a second group of N series-connected spiral conductor patterns on an insulating substrate, the first group being arranged in parallel with the second group and the conductor patterns of the first group and the conductor patterns of the second group being carried by a common substrate.

BRIEF DESCRIPTION OF THE DRAWING

FIG. 2 shows a coil configuration in accordance with the invention, FIG. 3 diagrammatically shows an apparatus in accordance with the invention.

DETAILED DESCRIPTION OF THE PREFERRED EMBODIMENTS

Figure 1:
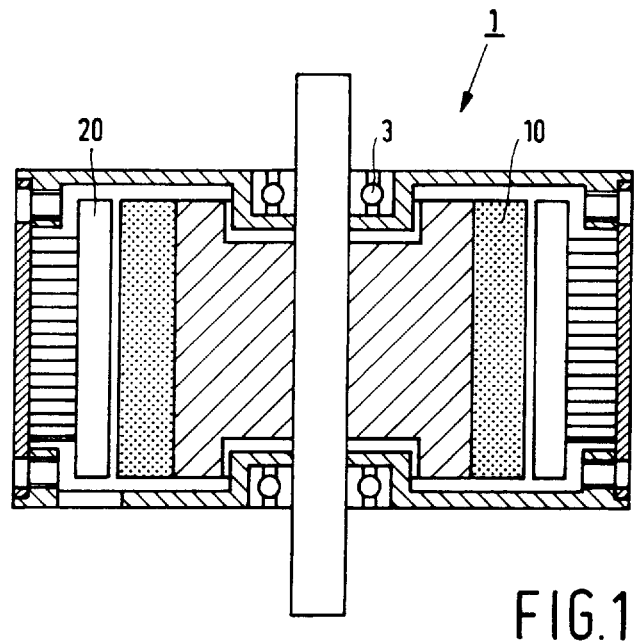
FIG. 1 is a cross-sectional view showing a first embodiment of the electromechanical device in accordance with the invention.

FIG. 1 is a cross-sectional view showing an electromechanical device 1 comprising a coil configuration 20 and a magnet system 10, which generates a magnetic field at the location of the coil configuration 20. The coil configuration 20 and the magnet system 10 are supported so as to be movable relative to one another by bearing means 3. The coil configuration 20 comprises an insulating substrate 30 carrying conductor patterns and formed into a cylindrical shape.

FIG. 2a is a plan view of such a substrate 30 and FIG. 2b is a view through the same insulating substrate 30 before it is given a cylindrical shape. The insulating substrate 30 carries a first group of 12 series-connected spiral conductor patterns 21a–21m and a second group of 12 series-connected spiral conductor patterns 22a–22m. The conductor patterns 21a, 22a, 21d, 22d, 21e, 22e, 21i, 22i, 21j, 22j, 21m and 22m are disposed on the upper side of the substrate 30. The conductor patterns 21b, 22b, 21c, 22c, 21f, 22f, 21h, 22h, 21k, 22k, 21l and 22l are disposed on the underside of the substrate 30. The conductor patterns on both sides of the substrate 30 are electrically interconnected by means of plated-through connections 40. For example, the spiral conductor pattern 21a is connected to the conductor pattern 21b via the plated-through connection 40a and the spiral conductor pattern 22a is connected to the conductor pattern 22b via the plated-through connection 40b. The conductor patterns are manufactured by locally etching away a conductive material, for example copper, from an insulating substrate 30 which at both sides has been provided with a layer of this conductive material. A customary technique for this utilizes a photoresist which is applied to the conductive layer and which is subsequently exposed locally in accordance with a given pattern. After development this resist forms a mask for locally etching away the conductive layer so as to form a conductor pattern. The plated-through connections can be obtained by making holes in the substrate 30 and subsequently depositing a metal onto the conductor patterns in an electroplating bath.

The first group is in arranged in parallel with the second group by means of common connection electrodes 51 and 52. The conductor patterns 21a–21m of the first group and the conductor patterns 22a–22m of the second group are carried by the same substrate 30. Moreover, the conductor pattern 21a of the first group is disposed concentrically relative to the conductor pattern 22a of the second group and together these conductor patterns form double spiral. The spiral conductor patterns of both the first group and the second group are regularly divided over the substrate 30 and, when the substrate 30 is arranged in a cylindrical shape in the electromechanical device 1, are also regularly divided over the magnetic field of the magnet system 10 (see FIG. 1).

By the method in which the spiral conductor patterns are connected it is achieved that the total length of the conductor 21 forming the first group is substantially equal to the total length of the conductor 22 forming the second group. The conductor pattern 21a, for example, is the inner conductor pattern of a first double spiral and is connected to the conductor pattern 21b, which is the outer conductor pattern of a second double spiral and, in its turn, is connected to the conductor pattern 21c, which is the inner conductor pattern of a third double spiral. This connection method ensures that the induced voltage across the first group is substantially equal to the induced voltage across the second group, so that hardly any eddy current losses occur.

Figure 3:
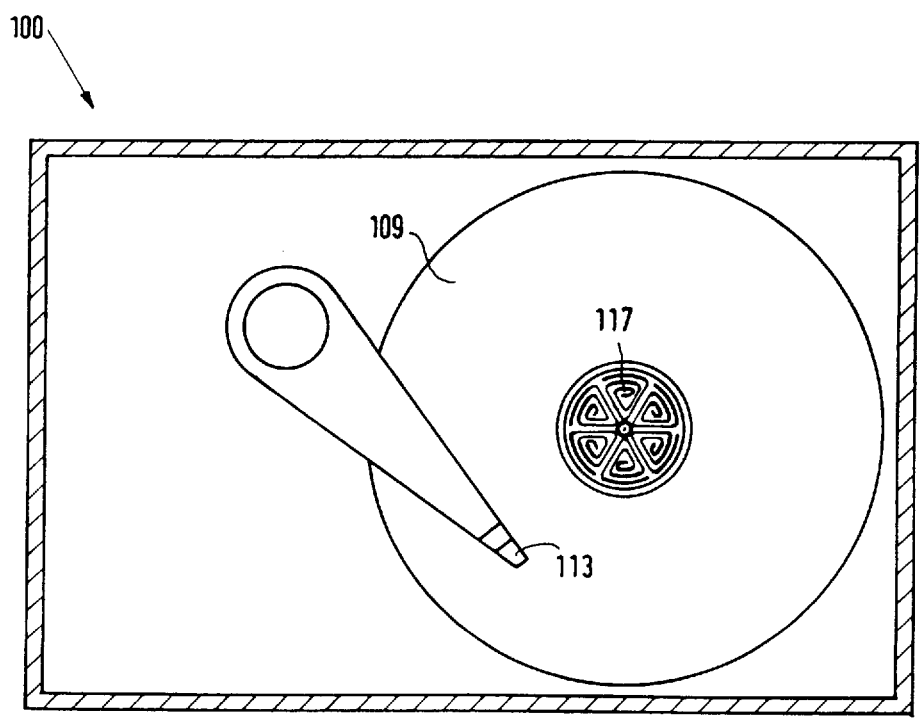

FIG. 3 shows an apparatus for the storage and/or reproduction of information on/from an information carrier. The apparatus, in the present case a hard-disk drive 100, comprises a head 113 for writing and/or reading information on/from a magnetic disk 109, and an electromechanical device in accordance with the invention in the form of a motor 117 for generating a relative movement of the disk 109 with respect to the head 113.

Figure 4:
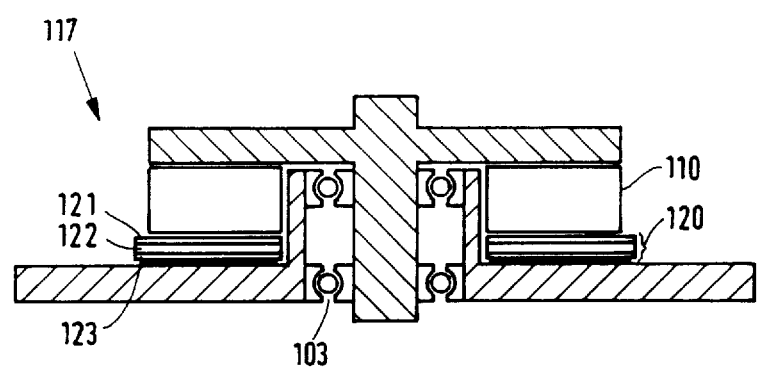
FIG. 4 shows a second embodiment of the electromechanical device in accordance with the invention.

FIG. 4 is a side view of the motor 117 shown in FIG. 3. The motor 117 comprises a coil configuration 120 and a magnet system 110, which generates a magnetic field at the location of the coil configuration 120. The coil configuration 120 and the magnet system 110 are supported so as to be movable relative to one another by bearing means 103. The coil configuration 120 comprises 3 phase windings 121, 122 and 123 which are arranged concentrically and which each comprise an insulating substrate carrying a first group of N series-connected spiral conductor patterns and a second group of N series-connected spiral conductor patterns, similar to the cylindrical coil configuration described hereinbefore.

It is to be noted that the number of parallel-connected groups is not limited to two. It is, for example, also possible to arrange three, four or even more groups in parallel. In that case the measures in accordance with the invention can be applied in a similar way. The invention has been elucidated hereinbefore with reference to the use of the electromechanical device as a motor. However, the advantages of reduced eddy current losses apply likewise when the electromechanical device in accordance with the invention is used as a generator for the generation of electric power by mechanically driving the magnet system relative to the coil configuration. Furthermore, it is to be noted that the number of pole pairs of the magnet system is irrelevant. The advantages of the invention are obtained for any number of pole pairs.

I claim:

1. An electromechanical device (1) comprising a coil configuration (20) and a magnet system (10) which generates a magnetic field at the location of the coil configuration, which coil configuration and magnet system are supported so as to be movable relative to one another, the coil configuration comprising a first group of N series-connected spiral conductor patterns (21a–21m) on an insulating substrate and a second group of N series-connected spiral conductor patterns (22a–22m) on an insulating substrate, the first group being arranged in parallel with the second group, wherein the conductor patterns of the first group and the conductor patterns of the second group are carried by a common substrate (30) having two sides, and wherein at least one of said conductor patterns of said first group forms a double spiral with at least one of said conductor patterns of said second group on one of said sides.

2. An electromechanical device as claimed in claim 1, characterized in that the conductor patterns (21a–21m) of the first group are regularly divided over the magnetic field and the conductor patterns (22a–22m) of the second group are regularly divided over the magnetic field.

3. An electromechanical device as claimed in claim 1, characterized in that the total length of the conductor forming the first group is substantially equal to the total length of the conductor forming the second group.

4. An apparatus (100) for the storage and/or reproduction of information on/from an information carrier, comprising a head (113) for writing and/or reading information on/from the information carrier (109) and an electromechanical device (107) as claimed in claim 1, for generating a relative movement of the information carrier with respect to the head.

5. A coil configuration (20) comprising a first group of N series-connected spiral conductor patterns (21a–21m) on an insulating substrate and a second group of N series-connected spiral conductor patterns (22a–22m) on an insulating substrate, the first group being arranged in parallel with the second group and the conductor patterns (21a–21m) of the first group and the conductor patterns (22a–22m) of the second group being carried by a common substrate (30) having two sides, and wherein at least one of said conductor patterns of said first group forms a double spiral with at least one of said conductor patterns of said second group on one of said sides.

6. An electromechanical device as in claim 5 wherein at least one of said conductor patterns of said first group forms a double spiral with at least one of said conductor patterns of said second group on each of said sides.

7. An electromechanical device as in claim 6 wherein said at least one conductor pattern of said first group on one of said sides is connected through said substrate to said at least one conductor pattern of said first group on the other of said sides, and wherein said at least one conductor pattern of said second group on one of said sides is connected through said substrate to said at least one conductor pattern of said second group on the other of said sides.

* * * * *